(12) United States Patent
Nakashima

(10) Patent No.: US 11,138,148 B2
(45) Date of Patent: Oct. 5, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Kazuya Nakashima, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 318 days.

(21) Appl. No.: 15/633,267

(22) Filed: Jun. 26, 2017

(65) Prior Publication Data

US 2018/0004737 A1    Jan. 4, 2018

(30) Foreign Application Priority Data

Jun. 30, 2016   (JP) ................. 2016-130604

(51) Int. Cl.
*G06F 16/00* (2019.01)
*G06F 16/11* (2019.01)
*G06F 16/16* (2019.01)
*G06F 16/172* (2019.01)
*G06F 16/17* (2019.01)
*G06F 16/176* (2019.01)
*G06F 16/18* (2019.01)
*G06F 16/14* (2019.01)

(52) U.S. Cl.
CPC ............ *G06F 16/11* (2019.01); *G06F 16/148* (2019.01); *G06F 16/16* (2019.01); *G06F 16/172* (2019.01); *G06F 16/173* (2019.01); *G06F 16/176* (2019.01); *G06F 16/1805* (2019.01); *G06F 16/1847* (2019.01); *G06F 16/1865* (2019.01)

(58) Field of Classification Search
CPC ...... G06F 16/11; G06F 16/148; G06F 16/172; G06F 16/173; G06F 16/176; G06F 16/1805; G06F 16/1847; G06F 16/1865
See application file for complete search history.

(56) References Cited

U.S. PATENT DOCUMENTS 7,194,505 B2 *   3/2007   Yano ................... H04L 12/1822
                                                           204/217
8,533,795 B2 *   9/2013   Nakatomi ............. G06F 21/608
                                                           726/6

(Continued)

FOREIGN PATENT DOCUMENTS

JP          2007-249806 A        9/2007

*Primary Examiner* — Jean M Corrielus
(74) *Attorney, Agent, or Firm* — Canon U.S.A., Inc. IP Division

(57) ABSTRACT

An information processing apparatus communicates with a server that manages files and enables an application that can open the files managed by the server to operate thereon. To search the files managed by the server, the information processing apparatus receives specification of conditions that represent attribute information of the files, manages log information of the files opened by the application, and displays a list of the managed log information on a screen of the information processing apparatus. The list of the managed log information displays, as information on each of the files included in the list, at least one piece of attribute information relating to the specified conditions from among a plurality of pieces of attribute information that is associated with each of the files.

5 Claims, 11 Drawing Sheets

(56) References Cited

U.S. PATENT DOCUMENTS

| | | | | |
|---|---|---|---|---|
| 8,768,987 | B2* | 7/2014 | Kobayashi | G11B 20/00086 |
| | | | | 707/831 |
| 10,115,147 | B2* | 10/2018 | Tanaka | G06Q 30/02 |
| 2008/0243835 | A1* | 10/2008 | Suzuki | G06F 16/951 |
| 2008/0313155 | A1* | 12/2008 | Atchison | G06F 16/93 |
| 2009/0077136 | A1* | 3/2009 | Igawa | G06F 16/1734 |
| 2009/0204606 | A1* | 8/2009 | Osada | G06F 16/172 |
| 2010/0082555 | A1* | 4/2010 | Ogawa | G06F 16/1734 |
| | | | | 707/688 |
| 2010/0179960 | A1* | 7/2010 | Shigeeda | H04N 1/00344 |
| | | | | 707/758 |
| 2012/0173511 | A1* | 7/2012 | Eto | G06F 16/14 |
| | | | | 707/711 |
| 2012/0221571 | A1* | 8/2012 | Orman | G06F 16/90324 |
| | | | | 707/737 |
| 2013/0006997 | A1* | 1/2013 | Asayama | G06F 16/2272 |
| | | | | 707/740 |
| 2013/0007002 | A1* | 1/2013 | Prahlad | G06F 16/1727 |
| | | | | 707/741 |
| 2013/0166732 | A1* | 6/2013 | Asayama | G06F 16/332 |
| | | | | 709/224 |
| 2013/0257902 | A1* | 10/2013 | Hasuike | G06F 1/3231 |
| | | | | 345/619 |
| 2014/0115485 | A1* | 4/2014 | Gao | G06F 8/61 |
| | | | | 715/738 |
| 2014/0229537 | A1* | 8/2014 | Hines | G06F 16/958 |
| | | | | 709/203 |
| 2015/0358935 | A1* | 12/2015 | Stegall | H04W 60/005 |
| | | | | 455/435.2 |
| 2016/0070731 | A1* | 3/2016 | Chang | G06F 17/30598 |
| | | | | 707/741 |
| 2016/0248889 | A1* | 8/2016 | Hines | G06F 16/958 |

\* cited by examiner

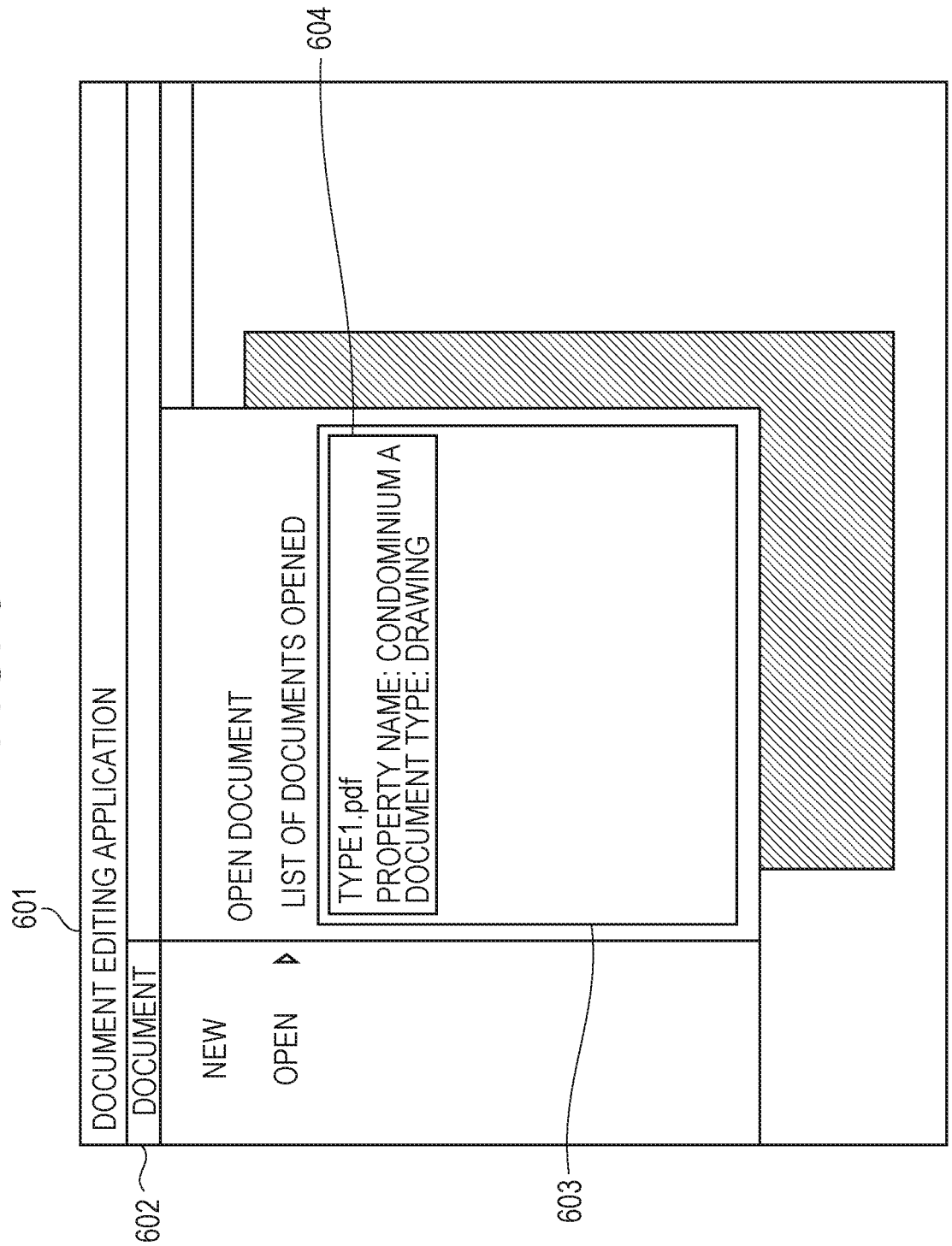

FIG. 7

| DOCUMENT NAME | PATH | PROPERTY NAME | DOCUMENT TYPE | CONTRACTOR |
|---|---|---|---|---|
| TYPE 1.pdf | http://172.xx.xx.xx/CONSTRUCTION DOCUMENT/... | CONDOMINIUM A | DRAWING | X CONSTRUCTION CO. |
| TYPE 2.pdf | http://172.xx.xx.xx/CONSTRUCTION DOCUMENT/... | CONDOMINIUM A | DRAWING | X CONSTRUCTION CO. |
| TYPE 1.pdf | http://172.xx.xx.xx/CONSTRUCTION DOCUMENT/... | CONDOMINIUM A | PLAN | X CONSTRUCTION CO. |
| TYPE 2.pdf | http://172.xx.xx.xx/CONSTRUCTION DOCUMENT/... | CONDOMINIUM A | PLAN | X CONSTRUCTION CO. |

| DOCUMENT NAME | PATH | PROPERTY NAME | DOCUMENT TYPE | CONTRACTOR |
|---|---|---|---|---|
| ESTIMATE.pdf | http://172.xx.xx.xx/CONSTRUCTION DOCUMENT/... | CONDOMINIUM A | ESTIMATE | X CONSTRUCTION CO. |
| ESTIMATE.pdf | http://172.xx.xx.xx/CONSTRUCTION DOCUMENT/... | CONDOMINIUM A | ESTIMATE | Y CONSTRUCTION CO. |

701 / 702 / 703 / 704 / 705

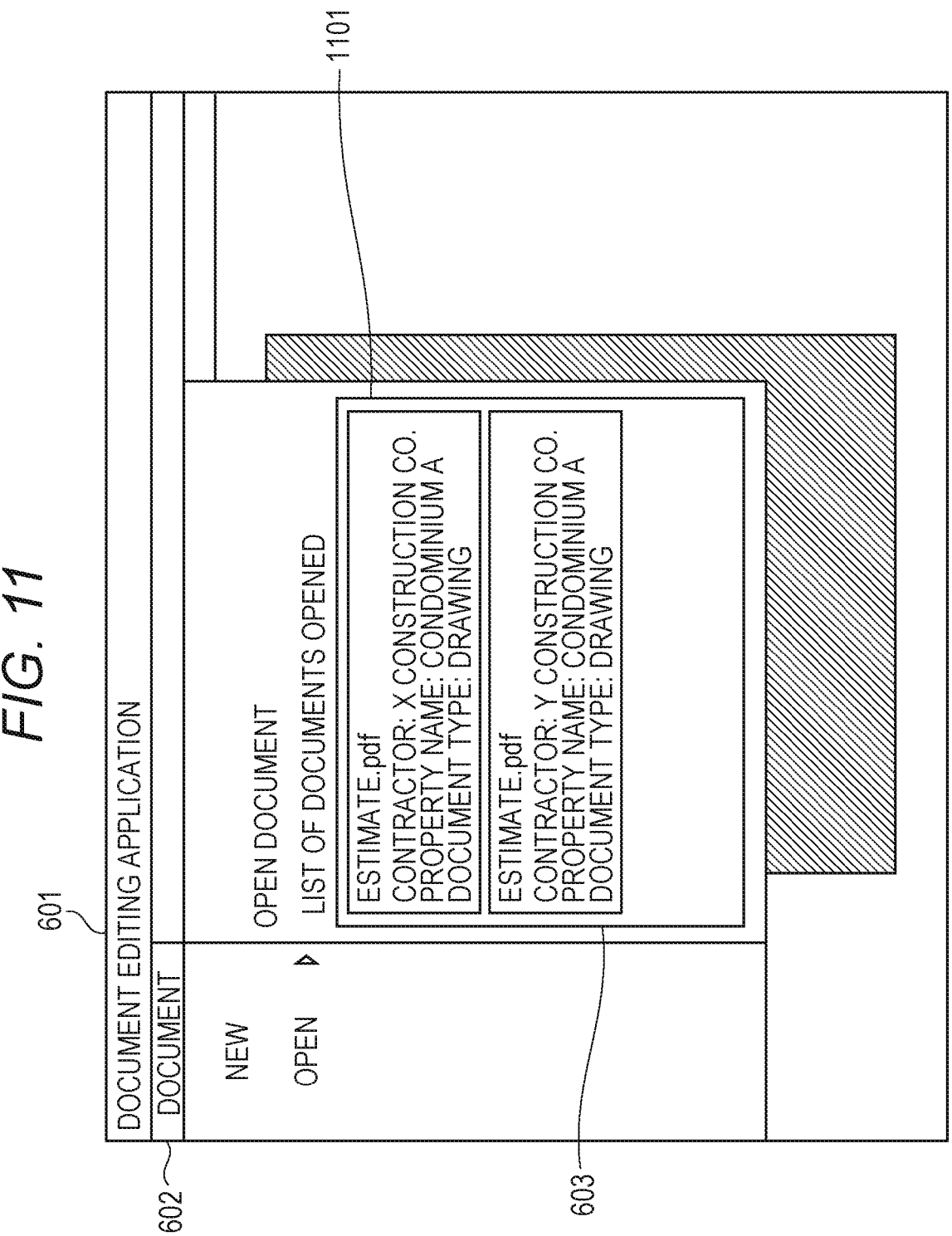

INFORMATION PROCESSING APPARATUS, CONTROL METHOD, AND STORAGE MEDIUM

BACKGROUND

Field

The present disclosure relates to an information processing apparatus, a control method, and a storage medium displaying a list of information relating to files that have been opened on an application.

Description of the Related Art

Three methods have been available for opening a file managed by a file server on an application that runs on a client terminal. One method applies to files managed by a hierarchical folder structure where a desired file is opened by tracing folders. Another method enables a user to input a keyword, an index, or any other condition and then opens a file from a list that represents results of a search operation. The third method is disclosed in Japanese Patent Laid-Open No. 2007-249806.

Japanese Patent Laid-Open No. 2007-249806 describes a document sharing system that enables a client terminal to access a document stored in a document sharing server. The client terminal can acquire, from the document sharing server, a list of documents recently used by the user and display the list.

According to Japanese Patent Laid-Open No. 2007-249806, the list of recently used documents displays fixed items such as an ID and a document name of an accessed document, information on the client terminal used for accessing, and a specific time of day when the document was accessed. Values of these items are not, however, necessarily required by the user for identifying a specific document in a log list.

For a file opened by the method for tracing the folders, including in the log list at least a path that indicates a storage location of the file enables the user to identify the file in the log list. With a file opened from the results list acquired through the search operation performed based on the input of a keyword, an index, or any other condition by a user, a file attribute, such as the index, that can serve as reference for the user to identify the file can, for example, be details used for the actual search operation. Specifically, the information that serves as reference for the user to identify a file varies depending on, for example, a method for managing the file and a search method applicable when the file is to be viewed.

SUMMARY

An information processing apparatus configured to communicate with a server that manages files and to enable an application that can open the files managed by the server to operate thereon includes a memory storing instructions and a processor that executes the instructions causing the information processing apparatus to receive specification of conditions that represent attribute information of the files to search the files managed by the server, manage log information of the files opened by the application, and display a list of the managed log information on a screen of the information processing apparatus. The list of the managed log information displays, as information on each of the files included in the list, at least one piece of attribute information relating to the specified conditions from among a plurality of pieces of attribute information that are associated with each of the files.

Further features will become apparent from the following description of exemplary embodiments with reference to the attached drawings.

BRIEF DESCRIPTION OF THE DRAWINGS

FIG. 6 is a diagram of an exemplary user interface of a document editing application.

FIG. 7 is a table illustrating exemplary document information in a first embodiment.

FIG. 9 is a table illustrating exemplary document information in a second embodiment.

FIG. 11 is a diagram of an exemplary user interface of a document editing application in the second embodiment.

DESCRIPTION OF THE EMBODIMENTS

The following describes exemplary embodiments with reference to the accompanying drawings.

First Embodiment

[System Configuration]

Figure 1:
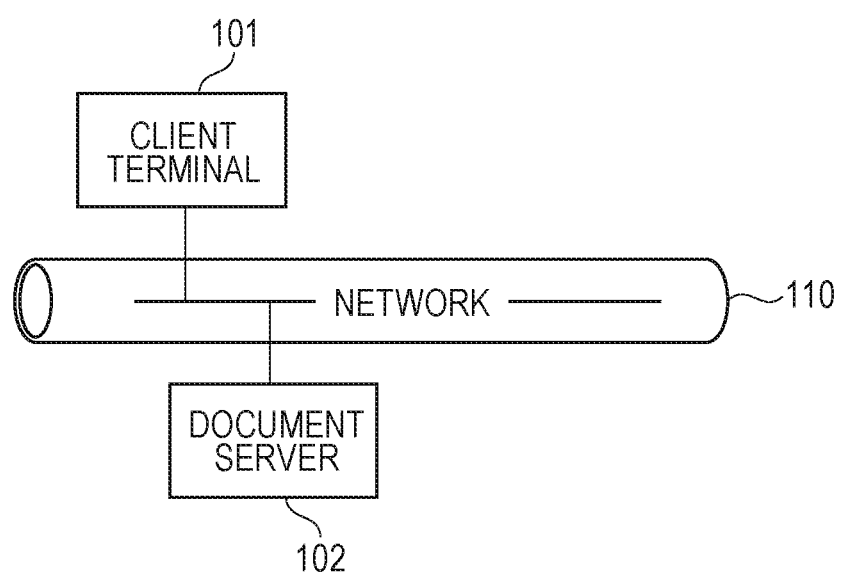
FIG. 1 is a diagram of a configuration of a system.

FIG. 1 is a diagram of a system configuration according to a first embodiment. A system that manages documents will be exemplarily described for the first embodiment.

A client terminal 101 and a document server 102 that manages documents are connected with each other via a network 110. In FIG. 1, the client terminal 101 and the document server 102 can be connected in plurality. The network 110 can, for example, be the Internet, a local area network (LAN), a wide area network (WAN), a telephone line, or a dedicated digital line. Alternatively, the network 110 can be what is called a communication network achieved by a combination of the foregoing examples. The network 110 is only required to transmit and receive data. The network 110 can be wired or wireless. Types of the client terminal 101 include, for example, desktop personal computers, notebook computers, mobile personal computers, tablet terminals, smartphones, etc. The client terminal 101 includes an environment in which programs, such as office applications and printer drivers, are executed. The document server 102 communicates with the client terminal 101 over the network 110. The document server 102 manages files, such as for example, documents. The files are not limited to documents, and any type of file, such as image data, etc., is applicable.

Figure 2:
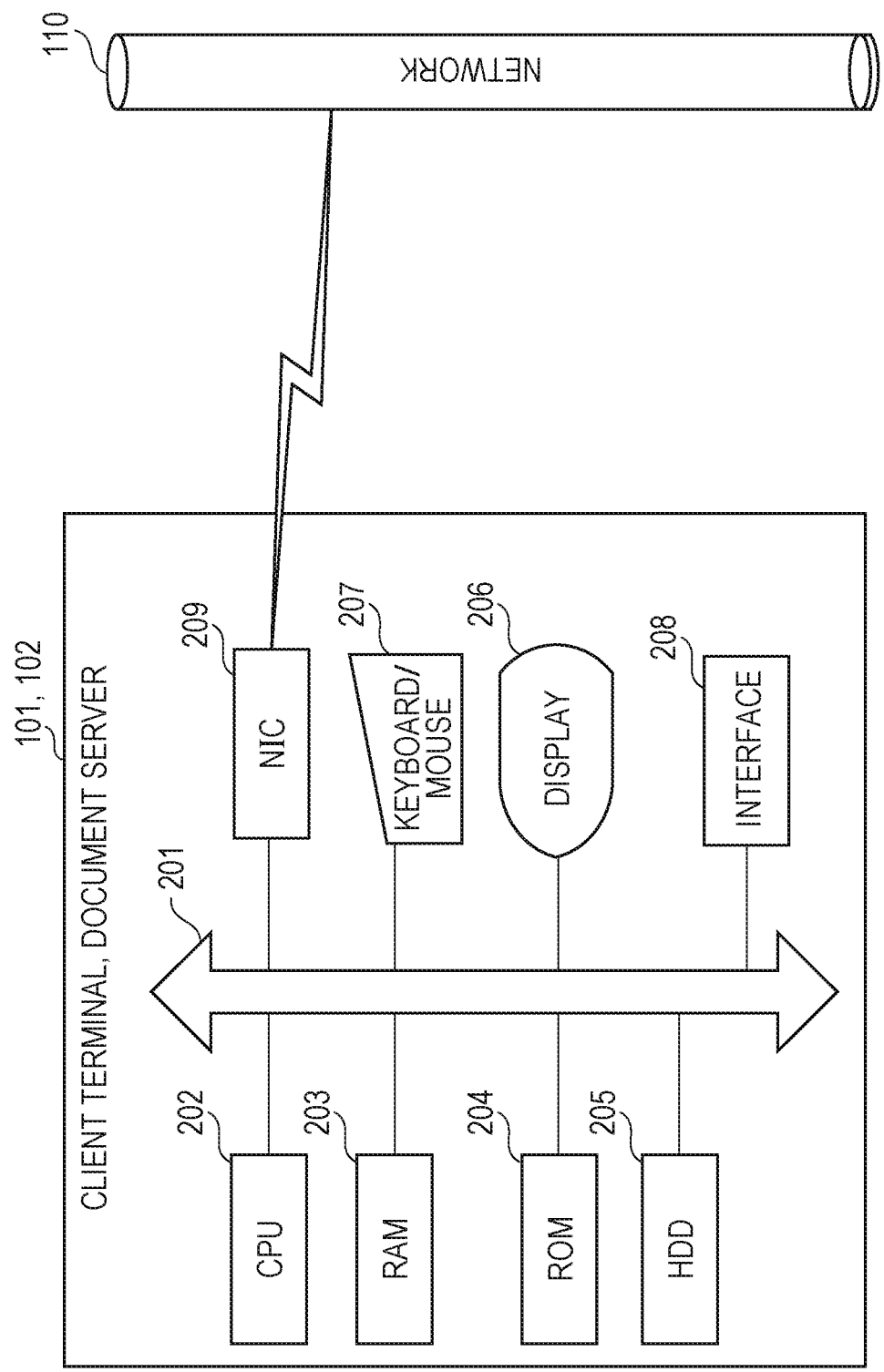
FIG. 2 is a diagram of a hardware configuration of a client terminal and a server.

FIG. 2 is a hardware configuration diagram illustrating an information processing apparatus implemented as the client terminal 101 and the document server 102 according to the first embodiment.

A CPU 202 controls the information processing apparatus. The CPU 202 executes, for example, an application program and an OS stored in a hard disk (HDD) 205 and controls to temporarily store, for example, information required for execution of programs and documents in a RAM 203. A ROM 204 is a storage unit and stores various types of data, such as a basic I/O program. The RAM 203 is a temporary storage unit and functions as, for example, a main memory and a work area of the CPU 202. The HDD 205 is a type of storage unit that functions as a large volume memory, and stores, for example, application programs including office applications and Web browsers, OSs, and associated programs. A display 206 is a display unit that displays, for example, a command input via a keyboard/mouse 207, which is an instruction input unit. An interface 208 is an external device I/F. A printer, a USB device, or a peripheral device (not illustrated) is connected to the interface 208. A system bus 201 controls flow of data inside the information processing apparatus. A network interface card (NIC) 209 enables data to be transferred to and from an external device via the NIC 209 and the network 110. The computer configuration described above is illustrative only and not limited to the configuration example illustrated in FIG. 2. For example, the destination where data and programs are stored can be changed from among, for example, the ROM 204, the RAM 203, and the HDD 205 depending on characteristics of the data and the program. Unless otherwise noted in the descriptions for the present embodiment, various processes are to be performed by a program that is, for example, loaded in the RAM 203 from the ROM 204 in which the program is stored and then executed by the CPU 202.

Figure 3:
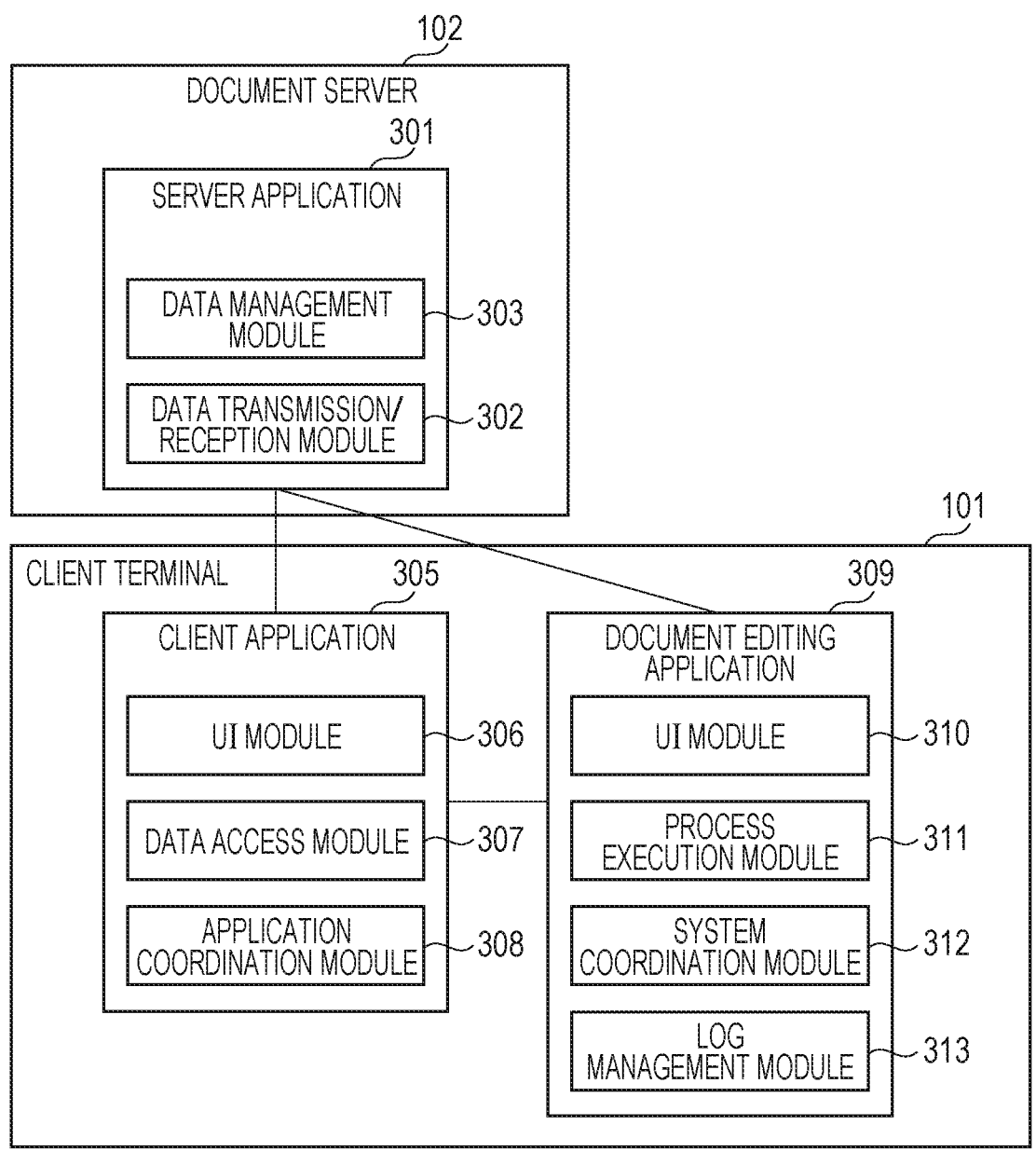
FIG. 3 is a diagram of a software configuration.

FIG. 3 is a block diagram illustrating software configurations of the client terminal 101 and the document server 102 illustrated in FIG. 1.

A server application 301 operates on the document server 102. The server application 301, for example, stores document data for a document management system and manages document information associated with each document. In response to a request from a client terminal application the server application 301 performs input and output of the document data and the document information.

A data transmission/reception module 302 receives a request from the client terminal application and instructs a data management module 303 to process the document data in accordance with details of the request. The data management module 303, having received the instruction from the data transmission/reception module 302, performs input and output and search of the document data.

A client application 305 operates on the client terminal 101. The client application 305 communicates with the server application 301 in accordance with a request from the user and enables access to the document data managed by the document management system.

Figure 4:
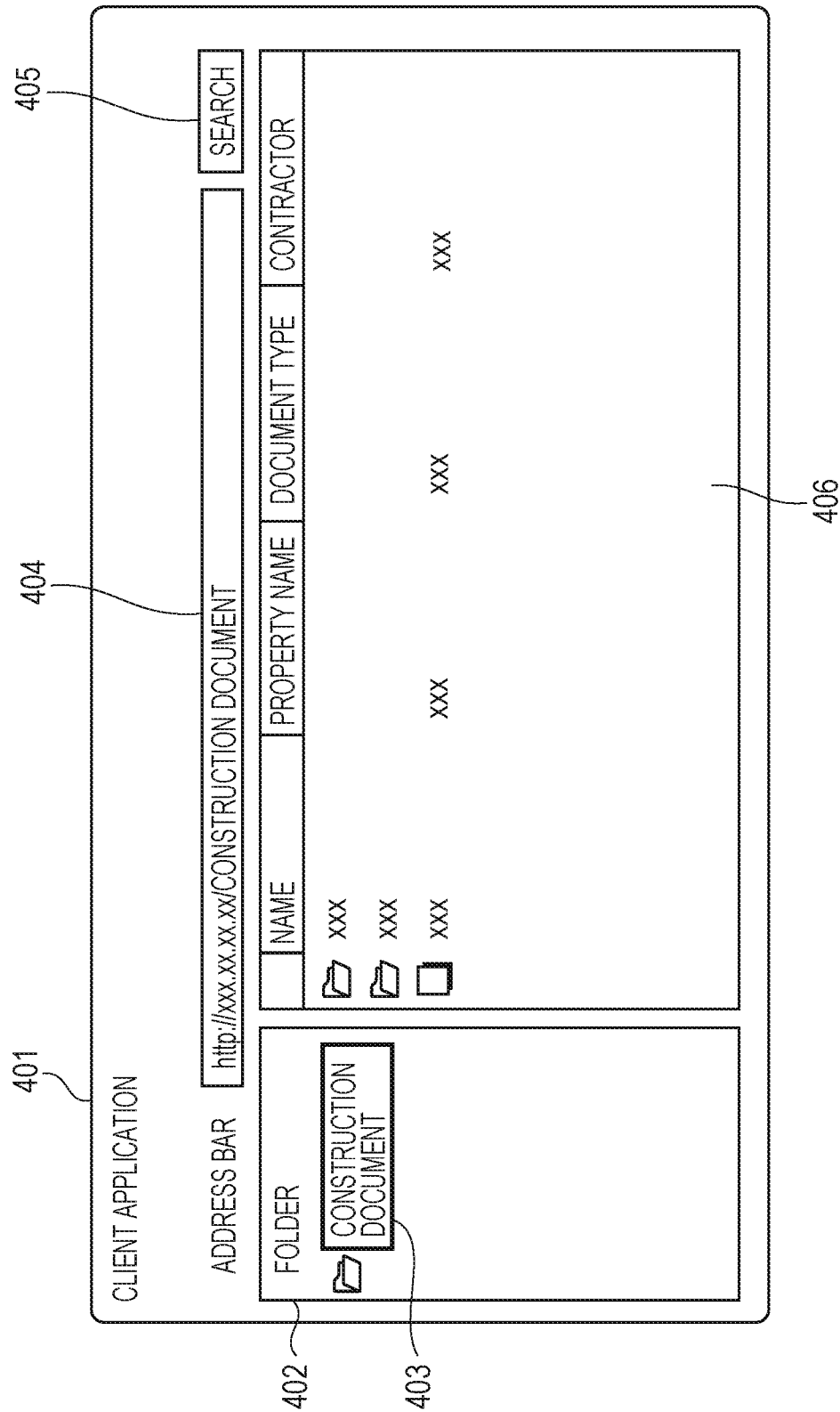
FIG. 4 is a diagram of an exemplary user interface of a client application for a document management system.

A UI module 306 configures a user interface illustrated in FIG. 4 and receives various types of input operations from the user to instruct a data access module 307 to perform corresponding processing. The data access module 307 communicates with the server application 301 in accordance with the instruction from the UI module 306 and accesses the document data managed by the document management system. An application coordination module 308 transfers the document data of the document management system accessed by the client application 305 of the document management system onto a document editing application 309 to thereby start the document editing application 309.

The document editing application 309 is an exemplary application that can edit and store documents. The document editing application 309 is installed in the client terminal 101. The document editing application 309 can edit and store documents managed by the document management system in accordance with a request from the user. The document editing application 309 can also edit and store documents managed by a document system of the OS installed in the client terminal 101.

Figure 5:
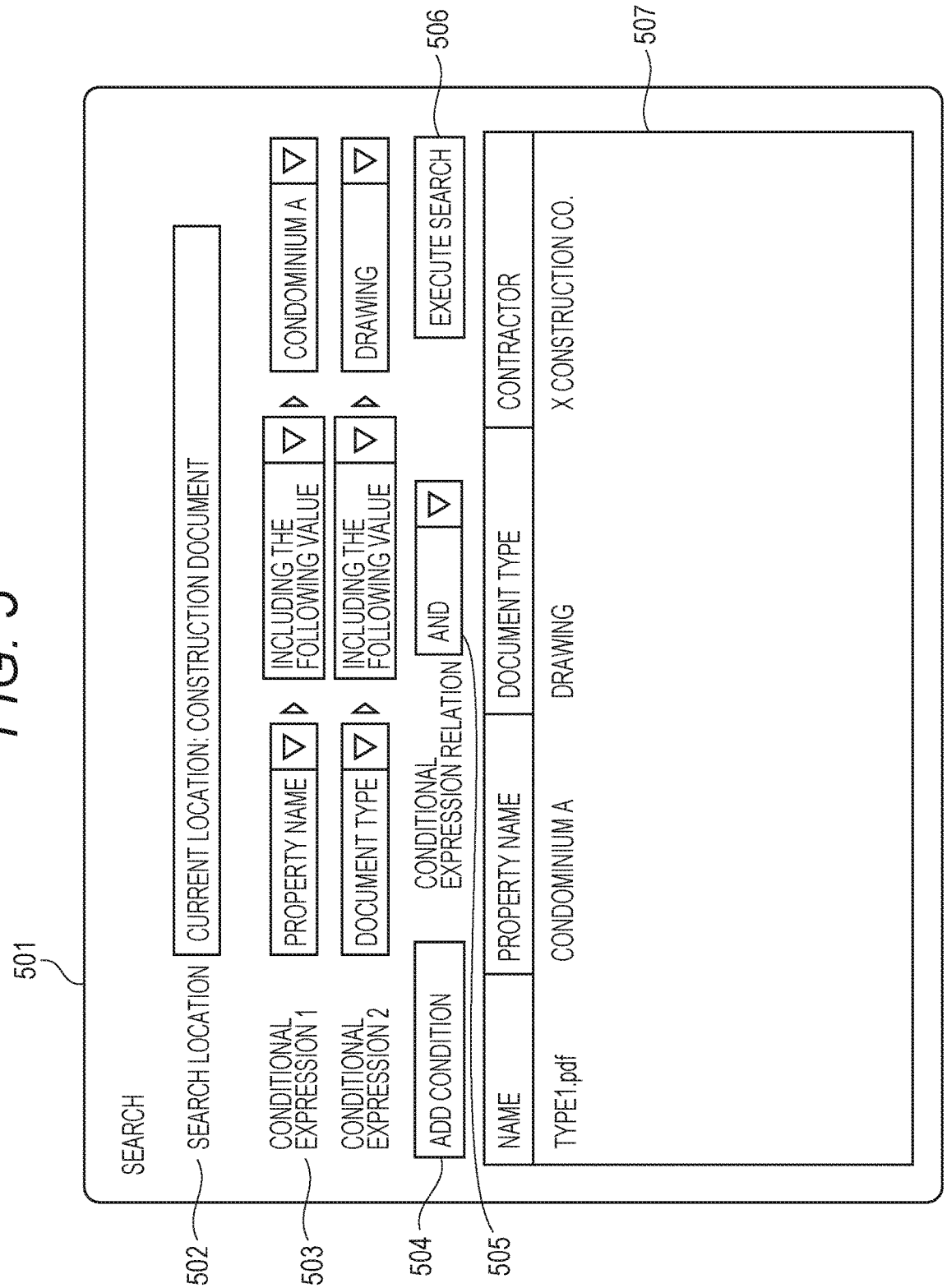
FIG. 5 is a diagram of an exemplary search user interface of the client application for the document management system.

A UI module 310 configures a user interface illustrated in FIG. 5 and receives various types of input operations from the user to instruct a process execution module 311 to perform corresponding processing. The process execution module 311 performs processing, including opening a document, updating a log, editing, printing, and storing, in accordance with the instruction from the UI module 310. A system coordination module 312 instructs the document management system to, for example, upload a document and acquire document information. A log management module 313 records and manages, as a log, document information of the documents opened by the document editing application 309. The log management module 313 manages a path for a document required for opening the document and display information for displaying in the log contents of the document.

FIG. 4 is a diagram schematically illustrating a display screen of the client application 305.

Reference numeral 401 denotes a user interface (UI) offered by the client application 305. Reference numeral 402 denotes an area that displays a list of folders managed by the data management module 303 of the server application 301. Reference numeral 403 denotes an exemplary folder displayed in the area 402. The folder 403 can be displayed in a tree view display. Reference numeral 404 denotes an address bar that displays a path for the folder selected in the area 402. In FIG. 4, the address bar 404 displays the path for the selected folder 403. Reference numeral 405 denotes a button to be pressed to execute a document search. Reference numeral 406 denotes an area that displays, in a list, the folder selected in the area 402 and documents contained in the folder. Selecting to execute a document displayed in the area 406 enables the document editing application 309 to be opened.

FIG. 5 is a diagram schematically illustrating a display screen of a search UI offered by the client application 305. Reference numeral 501 denotes the search UI representing a dialog for searching documents. The search UI 501 appears when the button 405 is pressed for executing a search operation. Reference numeral 502 denotes an area that displays a search location representing a target location to be searched for. FIG. 5 illustrates that the folder 403 selected when the button 405 is pressed, specifically, the construction document folder, is the target location.

Reference numeral 503 denotes a conditional expression or an area in which conditions of a document to be searched for are to be specified and displayed. Conditional expression input fields include, in sequence from left to right, an index type, a filter, and a search character string. The term "index", as used herein, indicates information on the document to be searched for. For conditional expression 1 in FIG. 5, a search condition is to "include a value" of "condominium A" with respect to an index type of "property name". The filter includes such options as "starts with the following value", "equal to the following value", and "not equal to the following value", in addition to "including the following value". Additionally, a plurality of conditional expressions can be specified as the search condition, as with conditional expression 1 and conditional expression 2 illustrated in FIG. 5.

Reference numeral 504 denotes a button for adding the search condition. To add to the conditional expressions already set in the example of FIG. 5 (two in the figure), the button 504 can be used. Reference numeral 505 denotes a field in which a conditional expression relation is to be selected. The field 505 displays a plurality of conditional expression relations from which one option is to be selected. Available options for the conditional expression relations are "AND" and "OR". In FIG. 5, the field 505 displays "AND", so that a search result displays documents that satisfy both conditional expression 1 and conditional expression 2.

Reference numeral 506 denotes a button to be pressed to execute a search operation using the search conditions input in the search UI 501. FIG. 5 illustrates that a search operation is executed at a location of "construction document" for documents that satisfy both conditional expression 1 AND conditional expression 2. Reference numeral 507 denotes an area in which the search result as a result of the search operation executed by the press of the button 506 is displayed. Selecting to execute a document displayed in the area 507 enables the document editing application 309 to be opened.

FIG. 6 is a diagram schematically illustrating a display screen of the document editing application 309, representing a state in which an application menu has been opened. Reference numeral 601 denotes a UI offered by the document editing application 309. The UI 601 includes editing functions such as displaying a preview of a document page and rotating a document page. Reference numeral 602 denotes the application menu. FIG. 6 illustrates a display state in which the application menu has been opened. Reference numeral 603 denotes an area in which a list of documents opened by the document editing application 309 is displayed. In the present application, the term "log list" refers to the list of documents opened by the document editing application 309.

Reference numeral 604 denotes an area in which information on the document opened by the document editing application 309 is displayed. FIG. 6 illustrates an exemplary log of a document with the following details: document name of "type1.pdf"; "property name" index of "condominium A"; and "document type" index of "drawing". Selecting the document information display area 604 enables the target document to be opened by the document editing application 309. In the present embodiment, the information on the document opened by the document editing application 309 is also referred as log information. Specifically, the log list includes at least one piece of log information.

When the document server 102 manages files using indices without using the hierarchical folder structure, the area 604 displays indices as document information as illustrated in FIG. 6. In contrast, when the document server 102 manages files using the hierarchical folder structure without using indices, the area 604 displays a document path as the document information. When the document server 102 manages files using both the hierarchical folder structure and indices, either the document path or the indices can be selectively displayed as the document information in the area 604. Thus, when the client terminal 101 is connected with a plurality of document servers 102, the item to be displayed in the area 604 can be changed based on the mode by which the document server 102 manages documents to thereby enable the user to readily identify the document displayed in the log list.

FIG. 7 is an exemplary table for managing document data according to the present embodiment. The document data is managed by the HDD 205 of the document server 102.

Reference numeral 701 denotes a document name. Reference numeral 702 denotes a path that indicates the location at which the document is stored. Reference numerals 703, 704, and 705 denote indices (attribute information) defined by the user, specifically, the property name index, the document type index, and the contractor index, respectively. The document name 701 can be handled as attribute information.

Figure 8:
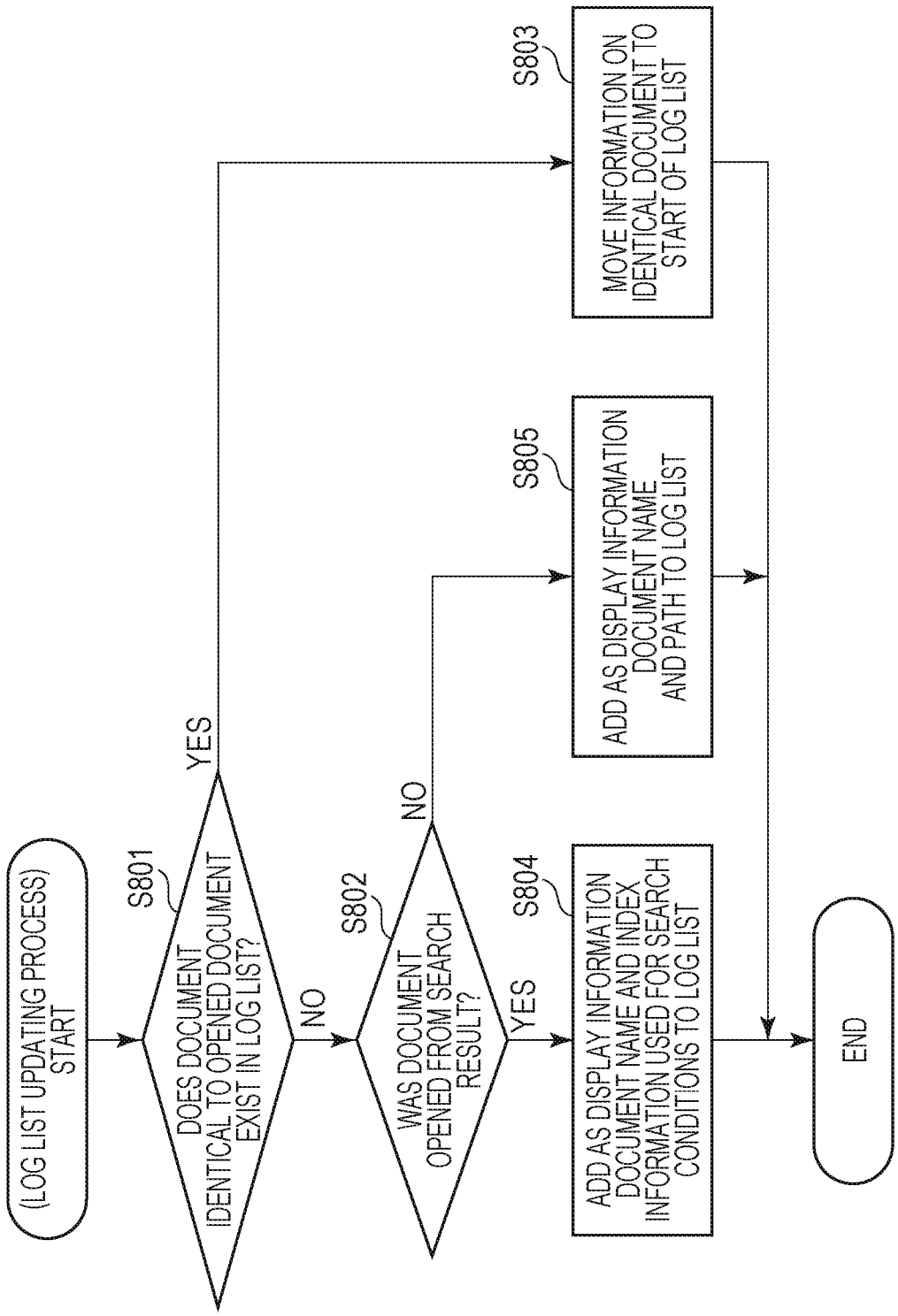
FIG. 8 is a flowchart of exemplary steps of a log list updating process in the first embodiment.

FIG. 8 is a flowchart of exemplary steps of a log list updating process in the first embodiment. The flowchart represents a process according to the first embodiment, in which information on the document opened when the document editing application 309 is started is added to the display list of the log list of the opened documents. The process is performed when the selected document is opened by the document editing application 309.

The process illustrated in the flowchart of FIG. 8 is performed by the document editing application 309 of the client terminal 101. Specifically, the process of the flowchart illustrated in FIG. 8 is achieved by the CPU 202 of the client terminal 101 loading and executing the program recorded in the HDD 205.

At Step S801, the log management module 313 determines whether a document identical to the opened document exists in the log. Specifically, for the document server 102 including a hierarchical folder structure, the log management module 313 determines that the opened document is identical to the document in the log if the path 702 of the opened document is identical to the path 702 in the log. For the document server 102 that manages documents using indices associated with respective documents, the log management module 313 determines that the opened document is identical to the document in the log if the ID of the opened document is identical to the ID of the document existing in the log list. If the identical document exists, Step S803 is performed. If the identical document does not exist, Step S802 is performed.

At Step S802, the system coordination module 312 determines whether the document was opened from a search result. Specifically, the system coordination module 312 determines whether the document was opened from the area 507 in which the search result is displayed. If it is determined that the document was opened from the search result, Step S804 is performed. If it is determined that the document was not opened from the search result, Step S805 is performed.

At Step S803, the log management module 313, which manages a sequence in which documents were opened, moves the information on the identical document to the starting position of the log. Specifically, the log management module 313 moves the log information of the identical document in the log list to the starting position of the log list to thereby rearrange the sequence. This sequence is reflected in the sequence in which the documents are displayed in the area 603. The performance of Step S803 causes the log information of the document in question to be displayed in the beginning in the area 603. The process ends after the performance of Step S803.

At Step S804, the system coordination module 312 adds to the log list the document name and the index information used for the search condition as display information. Specifically, the system coordination module 312 acquires the document information and search condition information from the client application 305 and the server application 301. The log management module 313 adds, as display information, the acquired information and the path 702 for opening the document to the log list. This step is performed when the document editing application 309 is started through selection of the document from the area 507 of the search UI 501.

Assume, for example, that a search operation is performed using the search conditions as illustrated in FIG. 5 and a document is opened from the area 507. In this case, the system coordination module 312 acquires from the client application 305 information that indicates that the indices used as the search conditions are the property name index 703 and the document type index 704. The system coordination module 312 then acquires from the server application 301 the document name 701 of the opened document and the property name index 703 and the document type index 704 as the indices used for the search conditions. Finally, the log management module 313 adds the acquired information and the path 702 for opening the document to the log list as the display information. The area 604 in FIG. 6 illustrates a log that is obtained when a search operation is executed for the property name index 703 and the document type index 704 using the search UI 501 and type1.pdf displayed in the area 507 is opened. Displaying an excerpt of one or more pieces of attribute information used for the search operation illustrated in FIG. 5 on the area 604 out of a plurality of pieces of attribute information of documents enables the user to more easily identify a specific document. The process ends after the performance of Step S804.

At Step S805, the log management module 313 adds the document name and the document path as the display information to the log list. Specifically, the system coordination module 312 acquires the document information from the client application 305 and the server application 301. The information to be acquired is the document name 701 and the path 702. The log management module 313 next adds the acquired information to the log list. The added information is displayed in the area 604. This step is performed when the document editing application 309 is started through selection of the document from the area 406 of the client application UI 401. The process ends after the performance of Step S805.

When the document information is added to the log list in the present embodiment, a step is performed to acquire index information according to the condition. A configuration can be possible in which the client application 305, while starting the document editing application 309, passes the index information of the document to the document editing application 309. Additionally, with Step S804, in addition to the index information used for the search condition, the display information of the search location 502 used for the search condition can be acquired and added to the log list.

The present embodiment, when to display a file opened from the search result in the log list, displays the file attribute information used for the search operation. The display of the file attribute information used for the search operation enables the user to more easily identify the file. With the mode of managing files through assignment of indices without using the hierarchical folder structure, in particular, displaying the indices as the file attribute information in the log list enables the user to identify the file.

By applying the present embodiment, the user can easily identify a document when the document that is opened from the search result list is displayed in the log list that lists documents that have been opened.

Second Embodiment

The following describes a second embodiment. The second embodiment differs from the first embodiment in that display information is updated depending on whether the log includes documents including display information identical to each other.

In the first embodiment, the user can easily identify a document that has been opened from a search result using the index information used for search conditions displayed in the log list that lists documents that have been opened.

There may, however, be a case in which different documents look alike in terms of document information displayed in the log, so that the user is unable to determine the target document. When, for example, a plurality of documents match in a search operation, the user first checks information on indices other than the indices used for the search operation before opening a specific document. In the first embodiment, the log displays document names and indices used for the search operation. Thus, opening the documents that match the search conditions yields displays of identical contents on the log can result in some difficulty differentiating one from another. In the second embodiment, for two documents displayed in the log list, information on different indices is displayed if the same indices are used for the search operation. Descriptions for the second embodiment omit descriptions given for like contents in the first embodiment.

FIG. 9 provides exemplary document data in the second embodiment, illustrating exemplarily five types of indices and two documents. The document data is managed by a HDD of a document server 102.

Descriptions for index types are the same as those in the descriptions for FIG. 7 and thus are omitted. Document data for the two documents are as follows. Specifically, information on a document name 701, a path 702, a property name index 703, and a document type index 704 is identical to each other, while a contractor index 705 differs between the two.

Figure 10:
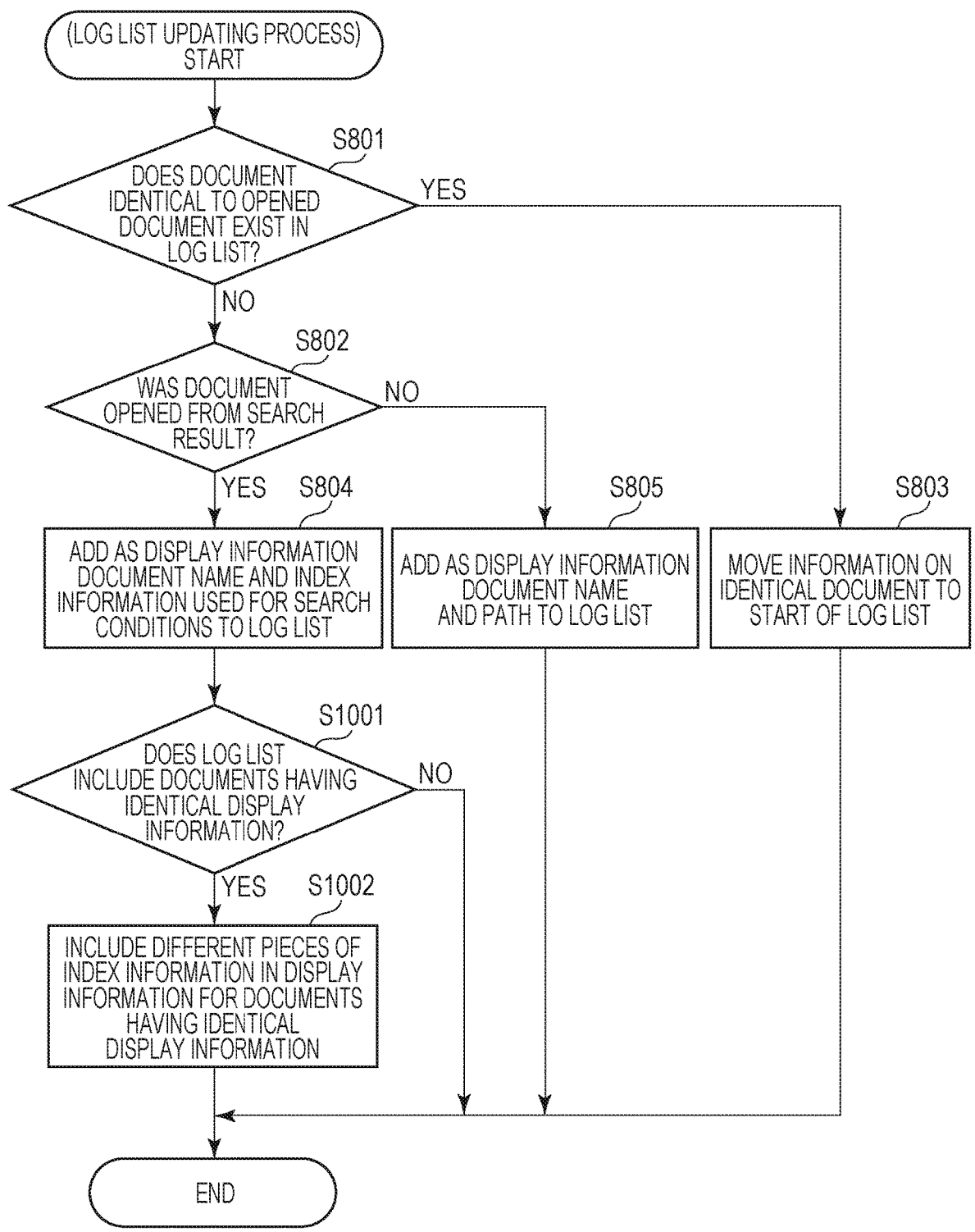
FIG. 10 is a flowchart of exemplary steps of a log list updating process in the second embodiment.

FIG. 10 is a flowchart of exemplary steps of a log list updating process in the present embodiment. The flowchart represents a process according to the present embodiment, in which information on a document opened when a document editing application 309 is started is added to a log list that lists documents that have been opened. The process is performed when the selected document is opened by the document editing application 309. The process illustrated in FIG. 10 includes steps of S1001 and S1002 added after the step of S804 described with reference to FIG. 8. The process of FIG. 10 is the same as the process of FIG. 8, except for the steps of S1001 and S1002.

At Step S1001, a log management module 313 determines whether the log includes documents with identical display information. Specifically, the log management module 313 determines whether identical display information exists in the log information of the log management module 313. Assume, for example, a case in which a search operation is performed using the search conditions as illustrated in FIG. 5 and the document is opened from the area 507. Then, two documents are displayed, as illustrated in FIG. 9. Opening each of the two documents yields identical display information in the log. The log management module 313 determines whether the foregoing state develops. If documents with identical display information exist in the log, Step S1002 is performed. If documents with identical display information do not exist, the process ends.

At Step S1002, the log management module 313 updates the log so that the display information includes different pieces of index information for the documents with identical display information. Specifically, the log management module 313 acquires all pieces of index information of the documents having identical display information and updates the log so that the display information includes different pieces of index information. Consider, for example, the two documents illustrated in FIG. 9. In this case, the contractor index 705 represents the different pieces of index information for the respective documents. The log management module 313 thus updates the log by including the different contractor indices 705 as display information. The process ends after the performance of S1002.

FIG. 11 is a diagram schematically illustrating a display screen of the document editing application 309 in the present embodiment, representing a state in which an application menu has been opened.

Reference numeral 1101 represents a display result in the area in which the log list is displayed when the two documents illustrated in FIG. 9 were opened in the second embodiment. The performance of Steps S1001 and S1002 cause the contractor index 705 of each of the two documents representing the different pieces of index information to be displayed in preference to other indices. This display result contributes to ready identification of the respective documents.

The present embodiment has been described, for Step S1002, for a case in which only one piece of different index information exists. If a plurality of pieces of different index information is involved, the step can cover only the first piece of index information found. Another approach can be to select a user-defined index in preference to others.

As described above, the present embodiment causes different pieces of attribute information to be displayed, if contents displayed in the log list are identical for any two files opened from the search result list. The application of the present embodiment enables the user to readily identify two files even when the contents displayed in the log list are identical for any two files opened from the search result list.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130604, filed Jun. 30, 2016, which is hereby incorporated by reference herein in its entirety.

What is claimed is:

1. An information processing apparatus capable of communicating with a document server, the information processing apparatus comprising:
one or more memories; and
one or more processors that execute a set of instructions to:
receive an input of at least one index associated with a file managed in the document server from a user, wherein the at least one index is used for searching for the file;
access a file managed in the document server by use of a result of the searching for the file using the at least one index; and
display file information for identifying the file having been accessed and display the at least one index having been used for searching for the file when the file has been accessed,
wherein, when each of the at least one index having been used for searching for the file is identical for any two files corresponding to the displayed file information, different indexes from among a plurality of indexes that are associated with each of the two files are displayed.

2. The information processing apparatus according to claim 1,
wherein a sequence in which files are accessed by an application installed in the information processing apparatus is managed as the access log, and
when an access log of a file that is identical to a file accessed by the application is managed, the managed sequence is updated and the access log is displayed in the updated sequence.

3. The information processing apparatus according to claim 1,
wherein the index of the files includes storage locations, names, and types of the files.

4. The information processing apparatus according to claim 1,
wherein the server manages files using a hierarchical folder structure, and
wherein the access log displays, as information on a file that has been accessed by specification of a folder without a search operation performed using specification of the search conditions that represent index of the file, a file path that indicates a storage destination of the file.

5. The information processing apparatus according to claim 1,
wherein the information processing apparatus communicates with a plurality of servers, wherein the servers include a first server configured to manage files using a hierarchical folder structure and a second server configured to manage files using index associated with the files without using the hierarchical folder structure, and wherein the access log displays, as information on a file that is managed by the first server and that has been accessed by specification of a folder without a search operation performed using specification of the search conditions that represent index of the file, a file path that indicates a storage destination of the file, and as information on a file that is managed by the second server and that has been accessed through a search operation performed using specification of the search conditions that represent index of the file, at least one piece of index relating to the search conditions from among a plurality of pieces of index that are associated with the file.

* * * * *